United States Patent [19]
Lynas et al.

[11] 3,786,348
[45] Jan. 15, 1974

[54] PIEZO ELECTRIC ACCELEROMETER PULSE TESTING

[75] Inventors: Derek Leigh Lynas, Fribourg, Switzerland; Alan Howard Lock, Belper; Paul Houghton, Alfreton, both of England

[73] Assignee: The Secretary of State for Defense in Her Britannic Majesty's Government of the United Kingdom of Great Britain and Northern Ireland, London, England

[22] Filed: Nov. 1, 1971

[21] Appl. No.: 194,367

[30] Foreign Application Priority Data
Oct. 30, 1970 Great Britain.................... 51694/70

[52] U.S. Cl............................... 324/56, 324/57 PS
[51] Int. Cl............................................ G01r 29/22
[58] Field of Search .................. 324/51, 52, 54, 55, 324/56, 57 PI, 57 Q

[56] References Cited
UNITED STATES PATENTS

| | | |
|---|---|---|
| 2,517,977 | 8/1950 | Cole et al. ............................ 324/56 |
| 2,890,410 | 6/1959 | Holcomb .......................... 324/55 X |
| 2,901,695 | 8/1959 | Weed................................ 324/54 X |
| 3,017,571 | 1/1962 | Moricca et al.................... 324/54 X |
| 3,250,990 | 5/1966 | Hubbs et al...................... 324/57 PI |
| 3,315,155 | 4/1967 | Colani............................... 324/6 X |
| 3,622,882 | 11/1971 | Gardner........................... 324/55 X |

Primary Examiner—Gerard R. Strecker
Attorney—Cushman, Darby & Cushman

[57] ABSTRACT

Method and apparatus for remotely indicating whether a piezoelectric transducer is properly connected in circuit and in an operable state. An input pulse is applied to the transucer and a resulting response above a predetermined threshold level drives an indicator to show the integrity of the transducer apparatus. Special digital counting techniques are used for rejecting spurious noise responses and insuring that indications of operability are truly reliable.

49 Claims, 7 Drawing Figures

PIEZO ELECTRIC ACCELEROMETER PULSE TESTING

This invention relates to a piezoelectric transducer testing system, and is concerned in particular with such a testing system suitable for testing piezoelectric accelerometers employed to monitor vibration in machines having rotating parts (such as gas turbine engines).

In many cases the presence of vibration in machines having rotating parts is indicative of an out-of-balance condition in the rotating parts, which condition can lead to failure of the machine. This is particularly so in turbine engines, which incorporate parts rotating at many thousands of revolutions per minute; the slightest imbalance in the rotating parts could lead to a disastrous failure of the engine. It is therefore desirable to check such machines for vibration in order to ascertain whether they are entering a failure mode.

In many gas turbine installations such checking is performed using a velocity-sensitive vibration-to-electric seismic transducer device. Such a device comprises essentially a magnet suspended on a spring and encircled by a coil, the whole being supported on a rigid mounting; vibrations induced in the magnet/spring assembly result in a voltage across the ends of the coil. In use, the device is positioned on the machine casing (or at any other appropriate point), the machine is actuated, and vibrations in the machine are transmitted to the seismic transducer device, which then gives a voltage output characteristic of the vibrational input. Analysis of this voltage output can give useful information about the vibrational input, and may indicate whether the machine is in a failure mode — that is to say, whether the machine is likely to fail as a result of imbalance therein.

Unfortunately, transducers of the seismic type suffer from a number of disadvantages. For example, they tend to be somewhat heat-sensitive, and are not suitable for use with modern gas turbine engines when circumstances necessitate a mounting point which may reach high temperatures. Moreover, they suffer from "sticktion" so that their response is poor at low vibrational frequencies and acceleration levels such as are experienced by a three-shaft turbofan engine. Furthermore, because they employ moving parts (the magnet/spring device) their reliability is usually poor.

These disadvantages may be overcome — or may substantially be overcome by using a piezoelectric transducer in place of the known seismic transducer. A piezoelectric transducer, which employs the piezoelectric effect (distortion of a piezoelectric crystal causes a voltage to be generated across the crystal), comprises essentially a piezoelectric crystal (or a stack thereof) having a mass mounted at one end and being mounted on a rigid base plate at the other end. Vibration is transmitted through the crystal to the mass and distortions in the crystal or stack end-to-end dimensions result in a voltage being generated across the ends. A piezoelectric transducer is used in an accelerometer in a manner similar to that in which a seismic transducer is used.

However, certain other problems arise when using a piezoelectric transducer, not the least of which is that it is occasionally very difficult to be sure that the transducer is actually connected and in a working state. Where the transducer is a separate entity to be attached to the machine during testing, or where the transducer is readily accessible, it is simple to tap the transducer (setting up vibrations therein) and then to check whether it is giving any output. However, where the transducer is permanently attached to the machine in an inaccessible position it is clearly desirable to have some system for testing its operation, which system can employ instruments and apparatus remote from the engine.

It is an object of this invention to provide such a testing system. In one aspect therefore, this invention provides a method of testing a piezoelectric transducer comprising applying at least one voltage pulse across the transducer, detecting the response or non-response of the transducer to said at least one voltage pulse, and indicating that said transducer has responded or not responded by means of an indicator.

Preferably, a plurality of voltage pulses are applied at one or more frequencies of application, and said frequency, or at least one of said frequencies, should be substantially a sub-harmonic of the resonance frequency of the transducer.

In a related aspect, this invention provides a method of testing a piezoelectric transducer in which a first switch is used to apply at least one voltage pulse across the transducer crystal or crystal stack, said first switch is opened and a second switch is then closed to connect the transducer to signal detecting means, said signal detecting means being adapted to produce signals indicative of the operational status of the transducer, and in which said signals are used to operate indicator means, said indicator means being adapted to indicate the operational status of the transducer.

Preferably, a repeating voltage pulse is applied by the first switch, and preferably said first and second switch are operatively linked to an oscillator in such a manner that the output of the oscillator controls said switches, said switches respectively being opened and closed once during each cycle of oscillation, said first switch thereby applying a repeating voltage pulse. The oscillator may be a voltage controlled oscillator with an input signal in the form of a voltage ramp, said oscillator thereby causing said first switch to apply a repeating voltage pulse at a frequency which varies with time.

In another aspect, the invention comprises a system for testing a piezoelectric transducer, comprising a voltage source connectable across the transducer piezoelectric crystal or crystal stack, signal detection means connectable to said transducer, and signal indicator means connected to said signal detecting means, whereby the operational status of said transducer is indicated.

Further, this invention provides a piezoelectric transducer testing system comprising:

a. a voltage source connectable across the transducer piezoelectric crystal(s) via a first switch;

b. a detector, for signals generated by said transducer, connectable across the transducer piezoelectric crystal(s) by a second switch;

c. means operable sequentially to close and open the first switch (while the second switch is open) and to close and open the second switch (while the first switch is open); and d. an indicator, connected to said detector, operable to indicate when a transducer signal is received and detected by said detector.

Essentially, the testing system of this invention operates in the following manner.

1. The first switch (between the voltage source and the transducer) is closed so that a voltage is applied across the transducer crystal(s). At this time, the second switch (between the transducer and the detector) is open.
2. Under the influence of the applied voltage the transducer crystal(s) distorts.
3. The first switch is then opened, while the second is closed.
4. The voltage having been "withdrawn," the transducer crystal(s) relaxes, causing a voltage to be generated thereacross.
5. This generated voltage is connected, via the second switch, to the signal detector.
6. The indicator then operates to show that a signal has been received and detected by the detector.

It will be appreciated that the operation of the indicator shows that the transducer is both properly connected and in working order.

The transducer crystal(s) is momentarily distorted by the voltage pulse applied thereacross as the first switch closes and opens, and as a result the crystal(s) resonates — or rings — in much the same manner as a glass rings when struck sharply by a knife. However, the output of a transducer upon relaxation of the crystal(s) therein after a single voltage pulse is very small, and dies away rapidly. It is therefore desirable to repeat the pulse after a short period. Furthermore, taking advantage of the fact that a piezoelectric crystal has a definite resonant vibrational frequency, it is desirable to keep pulsing the crystal at such a rate that it is excited into a strongly resonating state (in much the same way as a swing is forced higher and higher by a series of small pushes delivered at the right time); the output of a crystal as it decays from an excited, resonating state is considerably larger than when the crystal merely relaxes from a steady distorted state.

The rate at which the crystal is pulsed — the pulse frequency — is most desirably sub-harmonic of the crystal's resonant frequency; if, for example, the crystal resonates at 1,000 Hz, then the pulse frequency may be 100 Hz. In any case, as will be explained below, it is very much preferred that the pulse frequency should not be the resonance frequency, or a higher harmonic thereof.

The provision of a repeating pulse can be effected by linking the first switch to an oscillator in such a manner that the oscillator's output controls the closing and opening of the switch. The link can be so designed that for each cycle of oscillations the switch is closed and opened once; for example, as the amplitude of the oscillator's output signal passes up and down through a certain value the switch is closed and then opened. Accordingly, if the oscillator's output is a signal having a frequency which is a sub-harmonic of the natural resonance frequency of the crystal, then the first switch will close and open repeatedly to give a pulse series the frequency of which is also the desired sub-harmonic, and the crystal will resonate strongly at its natural frequency, giving a large output.

The oscillator is preferably associated with or incorporates a pulse shaper which, accepting the signal from the oscillator, produces a pulse of constant width which is then passed direct to the first switch to control its closing and opening thus producing a high voltage pulse.

Each crystal may have more than one resonating frequency, and these frequencies are usually different for different crystals (primarily because of their differing dimensions). Furthermore, the mechanical coupling of the crystal stack to the accelerometer case may result in excitation of resonant modes of the case also and all these frequencies may vary with the characteristics of the structure on which the accelerometer is mounted. Thus, in order to get a maximum output from any transducer, it is highly advantageous to arrange that all — or as many as possible — of the modes of vibration are excited and therefore it is preferred that the frequency of repitition of the pulse used to excite the transducer be varied over a sub-harmonic of the whole range of frequencies in which such transducers have natural modes of vibration. While it is not possible to utilize an oscillator which oscillates with all those frequencies at the same time, nevertheless it is possible to employ one whose oscillations change in frequency with time. Such an oscillator is a voltage-controlled oscillator incorporating a voltage ramp generator; the voltage ramp generator provides a steadily increasing voltage (which may automatically or manually be reset to its starting point after a scan), and this voltage then controls the frequency of the oscillator.

The voltage source is connectable to the transducer by a first switch controlled preferably by the output of an oscillator. The switch, which is advantageously electronic in nature rather than mechanical, is closed for a time long enough to allow the transducer crystal(s) to be sufficiently distorted (during this time, the second switch — transducer to detector — also preferably electronic, is in an open position).

The second switch connects the transducer to the detector. It is open when the first switch is closed (the transducer is being pulsed) in order to prevent the signal exciting the transducer passing straight through to the detector. However, after the first switch opens the second switch closes to enable the transducer's output to be fed to the detector, and it will be apparent that the operation of the two switches should be linked in order to ensure firstly that they are not both closed at the same time.

It is therefore convenient if the means employed to operate the first switch is, with a slight delay built thereinto, also used to operate the second switch. Accordingly, if an oscillator is employed to control the first switch then preferably it is also employed to control the second switch — only in the latter case, a slightly later point in the oscillator's output signal cycle activates the switch into a closed position, and the switch is not opened again until the beginning of a new cycle (the point at which the first switch is closed).

It will thus be apparent that the means operable sequentially to close and open the first and second switches is preferably a voltage-controlled oscillator whose output, conveniently modified by a pulse shaper, is passed to the switches to actuate them in sequence and at and for the right time. A complete sequence of switch closings and openings corresponds to one cycle of the oscillator's output, and is referred to herein as "a cycle."

It is preferred that the testing system of this invention also includes a third switch placed in circuit to short out directly the transducer. The transducer itself, as well as the leads from it, will have a certain capacitance, and thus will store up electric charge when pulsed by the voltage source. When the second switch is closed, connecting the transducer to the detector, this stored charge will surge through the detector, giving rise to a signal having some similarity to that of the transducer itself. Since this "capacitive" signal will occur whether the transducer is operational or not, it is desirable that it is prevented from passing to the detector, and this can be done by placing in circuit across the transducer a third switch which is arranged to close for a short time after the first switch has opened and before the second switch is closed. Shorting out the transducer in this manner allows any stored charge therein, or in the leads thereto, to equalize — and thus prevents the possibility of a misleading signal being sent to the detector. Naturally, closing and opening of the third is linked with the operation of the first and second switches, so that preferably the means controlling the first and second switches (preferably the voltage-controlled oscillator) is also used to control the third switch.

The sequence of operation of the three switches is thus as follows.

The first switch closes and opens to pulse the transducer; the third switch then closes and opens to equalize any stored charge; and — after a slight delay to allow the transducer system to settle down — the second switch closes an opens to pass the transducer signal to the detector.

The detector is essentially an electronic circuit which accepts the signal from the transducer and converts it into a form suitable for operating the indicator. Preferably, however, it is associated with or incorporates a signal amplifier and impulse counters, together with other circuit elements described below.

The transducer output is weak — in spite of ensuring that the transducer is put into a strongly resonating state — and therefore it is highly advantageous to amplify its output before the latter is fed to the detector. Accordingly it is preferred that the testing system of this invention includes an amplifier placed in circuit between the second switch and the detector. Conveniently this amplifier has a subsidiary output point connectable to apparatus for analyzing the exact form of the output (and thus of the transducer's output). The exact form of the transducer's output will depend on many factors, but in general it will consist of a number of wave forms of varying amplitude.

After the amplifier, the signal passes to the first element of the detector proper, which element is conveniently a zero-crossing detector. This device is a bistable device — that is to say, it has two stable operating positions (as "on" or "off") — and it is designed to change from one state to another whenever the input signal reaches and crosses a certain level, conveniently a zero amplitude level. The device is described in more detail below, but briefly it comprises a trigger circuit adapted to switch to an active state as the indicator passes upwards through a certain level (+V) and then to switch to a passive state as the signal, having gone through the zero position, passes downwards through a certain level (−V). The spacing between (+V) and (−V) is known as the hysteresis of the circuit, and may be adjusted to have any value, and to be in any position, desired. The purpose of the zero-crossing detector is to convert the signal from the amplifier into an "on/off," or square wave, signal to be fed into the next stage of the detector.

The testing system of this invention, like all electronic equipment, is subject to "noise" — that is, signals induced into the system which have nothing to do with the information being obtained and processed, and which are thus undesirable.

Noise signals may originate outside the system altogether (other electronic devices operating in the vicinity) or may originate inside the system (for example, in spite of shorting out the transducer it may still carry a capacitative charge).

It is therefore advantageous to incorporate into the system, between the amplifier and the detector (and preferably after the zero-crossing detector), a noise inhibition gate operating to block any signals at that point which are likely to be noise signals. Now, any noise signals induced into the system are likely to be of short duration, and are unlikely to result in more than a small number of state changes in the zero-crossing detector. The transducer signal, however, will result in a large number of state changes. Accordingly, noise signals can at this stage be blocked by using a counter adapted to give an output only if more than a small number — say four — stage change cycles occur in the zero-crossing detector. Thus, if during one period when the second switch is closed more than four stage change cycles occur in the zero-crossing detector, the counter will operate to pass an output to the next stage. The counter is, of course, reset at the end of each period when the second switch is closed, and preferably a signal from the voltage-controlled oscillator is used to initiate this reset.

The output from the counter (referred to hereinafter for convenience as the "four-counter"), which output is either a "zero" signal or a steady "positive" signal, is conveniently then passed to a "bistable set/reset" element. This element is adapted to have one stable state (a "set" state) is a signal is received from the four-counter and a second stable state (a "reset" state) is no signal is received. Furthermore, the element is adapted to give a single pulse output when its state is changed from the "set" to the "reset" condition. The resetting of the element is conveniently automatically initiated by an end-of-cycle (second switch opens) signal from the voltage-controlled oscillator; if the element has received a signal from the four-counter it will be in the set position, and upon resetting will emit an output pulse, while if it has received no such signal (and thus is still in its initial reset state) it will give no output.

Even when using a noise inhibition gate (the four-counter described above) there is still a possibility of noise being induced into the device and activating the detector/indicator. A particular burst of noise might, for example, produce a train of pulses long enough to activate the four-counter and thus the bistable set/reset element. It is particularly unlikely, however, that the burst of noise would last longer than a small number of cycles. Accordingly, it is advantageous to include in the circuit, after the bistable set/reset element a further noise inhibition gate, preferably in the form of another pulse counter, which operates to allow a signal to pass through only when a preset number of pulses has been received from the bistable set/reset element. For example, any noise signal are very unlikely to result in more than 16 pulses from the bistable set/reset element, so this second pulse counter is preferably set at 16, and will only switch to an active state, with positive output, after it has received more than that number of pulses.

The 16-counter may automatically be reset at the end of every scan (the cycle of the voltage ramp generator output, which controls the voltage-controlled oscillator). Alternatively, or in addition, it may be reset manually at the end of the test.

Once the 16-counter has switched to an active state, and is giving a positive output, that is a reliable indication that the transucer is operational. Conversely, if at the end of a scan the 16-counter is still giving no output, then that is a reliable indication that the transducer has failed. In either case, of course, it is desirable that the "signal" should be displayed as information on an indicator connected to the final stage of the detector (the 16-counter) and responsive to its output (or its lack of output). It is preferred in particular that the indicator should be a three-way indicator, which shows a "neutral" position (indicator working), a "no-signal" position (transducer failed or not in circuit) and a "signal" position (transducer operating satisfactorily). The indicator switch is conveniently linked to the voltage ramp generator in such a manner that during the scan the indicator is in the "neutral" position until a signal is received from the 16-counter, when it switches to the "signal" position, while at the end of the scan the indicator is switched to the "no signal" position is no signal has been received from the 16-counter.

The indicator is preferably a meter — a volt meter — connected to the detector output and the voltage ramp generator via switch systems as appropriate. It will be understood, however, that it can be a light system or a sound system — or any two or all three thereof. It may automatically be reset — after a 10 second time interval, for example — but preferably it is manually reset.

Once the testing system of this invention has been employed, it is desirable that the various components thereof should be reset into a ready mode so that the system may be employed again. The components that require a reset are the voltage ramp generator, the pulse counters and the indicator, and while they may be designed for an automatic reset (as explained hereinabove), nevertheless it is preferred that the system include a manually operated reset device by which these components may be cleared and placed in a ready state.

The testing system naturally requires a source of electrical power. This source is most conveniently batteries of the appropriate voltage, and in order to compensate for partial battery failure (voltage drop due to age) it is preferred to employ voltage regulator circuits where required.

The testing system of this invention preferably forms part of a complete accelerometer testing unit which, as well as testing for the presence of an operational transducer, also tests for cable and accelerometer installation leakage, and for correct vibration indicator calibration. The installation leakage test system essentially measures the resistance across various points of the unit which are supposed to be insulated from each other, while the calibration test system essentially checks the capability of the vibration analyser system to distinguish between acceptable and unacceptable vibration patterns.

The piezoelectric transducer testing system of the invention is now described with reference to the accompanying drawings, in which.

Figure 1:
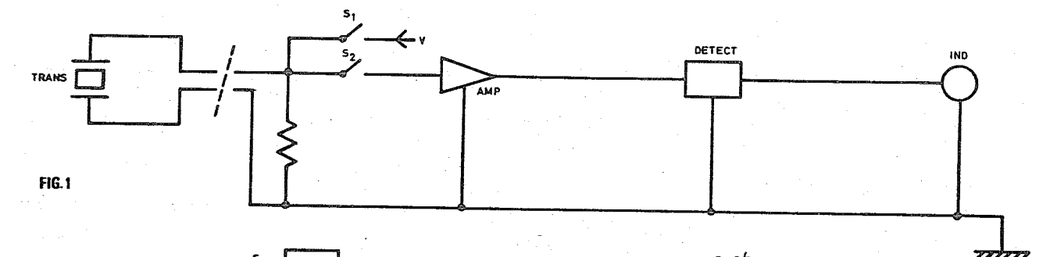
FIG. 1 shows a schematic block diagram of the circuit of a simple embodiment of the invention.

The diagram of FIG. 1 shows a voltage source (V) connectable via a first switch (S1) across a piezoelectric transducer crystal (Trans.). A second switch (S2) when closed connects the output of the transducer through an amplifier (Amp) and the detector (Detect) to an indicator (Ind).

The two switches (S1, S2) are both shown open in the diagram, but when the circuit is in operation one switch will be closed while the other is open. Thus, when the first switch (S1) is closed, connecting the voltage source across the transducer, the second switch (S2) is open, and vice-versa.

Figure 2:
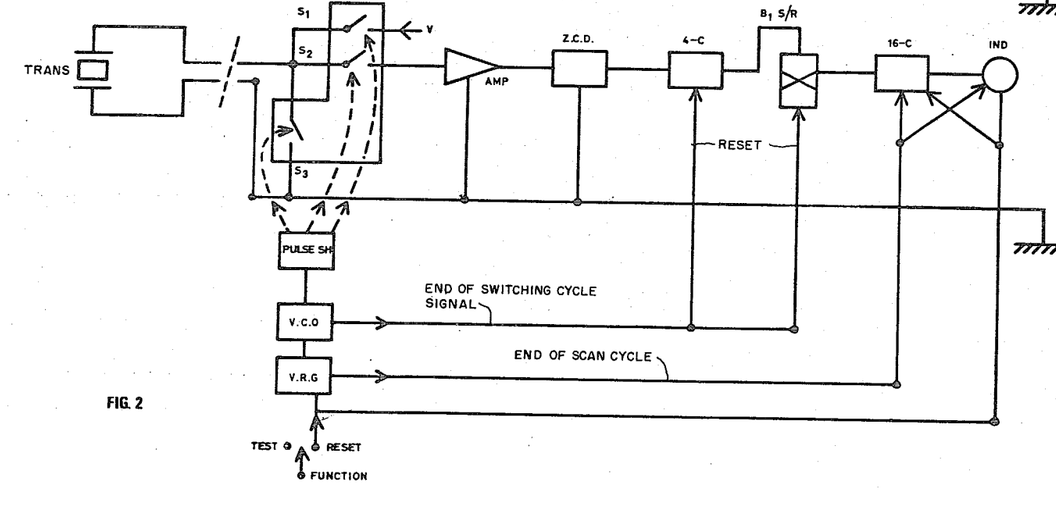
FIG. 2 shows a schematic block diagram of the circuit of a more complex embodiment of the invention.
Figure 3:
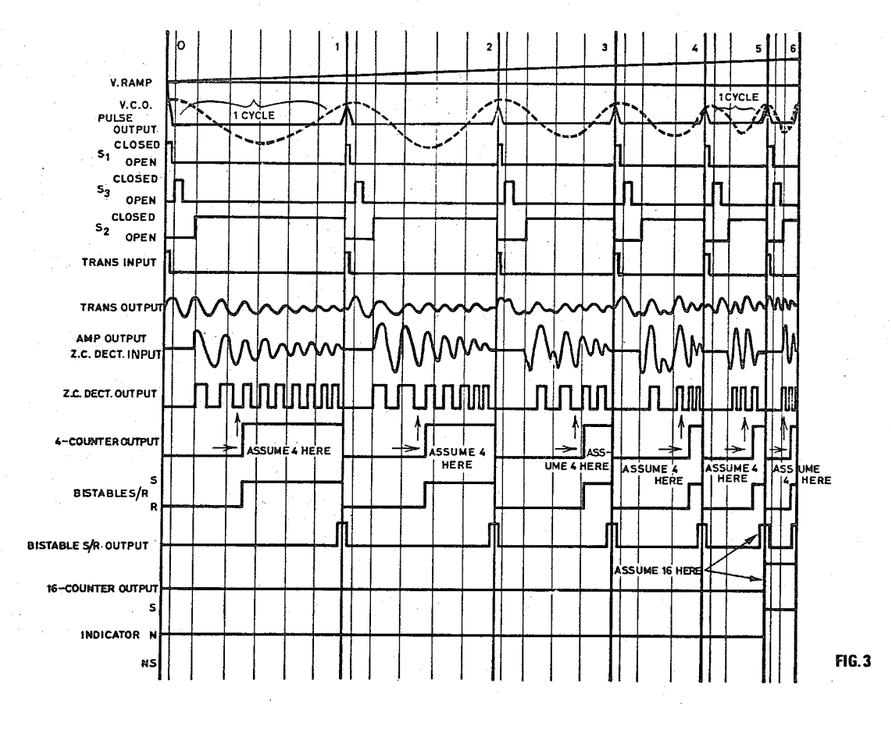
FIG. 3 shows the signals at various points of a system as it tests an operational transducer.

The diagram of FIG. 2 shows a voltage source (V) connectable via a first switch (S1) across a transducer crystal (Trans.). The operation of the first switch is controlled by a voltage-controlled oscillator (V.C.O) which is itself controlled by a voltage ramp generator (V.R.G.) to give a sweep frequency output and powered, via a voltage regulator, by a battery (not shown). The output of the oscillator is passed first to a pulse shaper (Pulse sh.), then to the switch.

A second switch (S2), also controlled by the oscillator, when closed connects the transducer output through an amplifier (Amp), a zero-crossing detector (Z.C.D.), a first pulse counter (4–C), a bistable set/reset element (Bi S/R) and a second pulse counter (16–C) to an indicator (Ind).

A third switch (S3), also controlled by the oscillator, when closed shorts out the transducer, allowing any capacitative charge thereacross to equilibrate.

FIG. 2 shows the various signals at several points in a system as it is used to test a transducer. Six cycles of the oscillator are shown (start at 0, then number 1, 2 ... 6).

The output of the oscillator is a wave of increasing frequency; it is fed to the pulse shaper to give a sharp pulse at the beginning of every cycle (arbitrarily shown as the point of maximum amplitude in the oscillator output signal). The pulse triggers the first switch (transducer-to-voltage source) closed for a short period, then it triggers the third switch (transducer short) closed for a short period, then — after a small delay — it triggers the second switch (transducer-to-detector) closed for the remainder of the cycle.

The transducer is excited while the first switch is closed, and will ring (or resonate) at a natural resonance frequency. The magnitude of the ringing will be enhanced if the frequency of the oscillator is a subharmonic of the transducer resonant frequency. The transducer's output is passed to the amplifier while the second switch is closed, and the amplifier's output is passed to the zero-crossing detector.

The zero-crossing detector changes its state whenever the amplifier signal passes from a (+V) value to a (−V) value (see inset), giving a "square wave" output which is passed to the four-counter. When the four-counter has received four square wave input pulses it gives a positive output which is passed to the bistable set/reset element. At the end of each cycle the four-counter is automatically reset by a control pulse from the oscillator.

On receiving a signal, the bistable set/reset element adopts its "set" state, and, upon receiving a reset signal from the oscillator at the end of each cycle, it gives out a single pulse which is passed to the 16-counter.

After 16 pulses from the bistable set/reset element, the 16-counter gives a positive output (in the Figure, for convenience, the end of the fourth cycle — point 4 — is shown as being the sixteenth pulse point, though in reality at least 16 cycles would be needed to reach the sixteenth pulse point).

Provided that the 16-counter registers an output before the end of the scan, the indicator (which has previously been in a "neutral" position) now changes to a "signal" position, showing that the transducer is operational.

Figure 4:
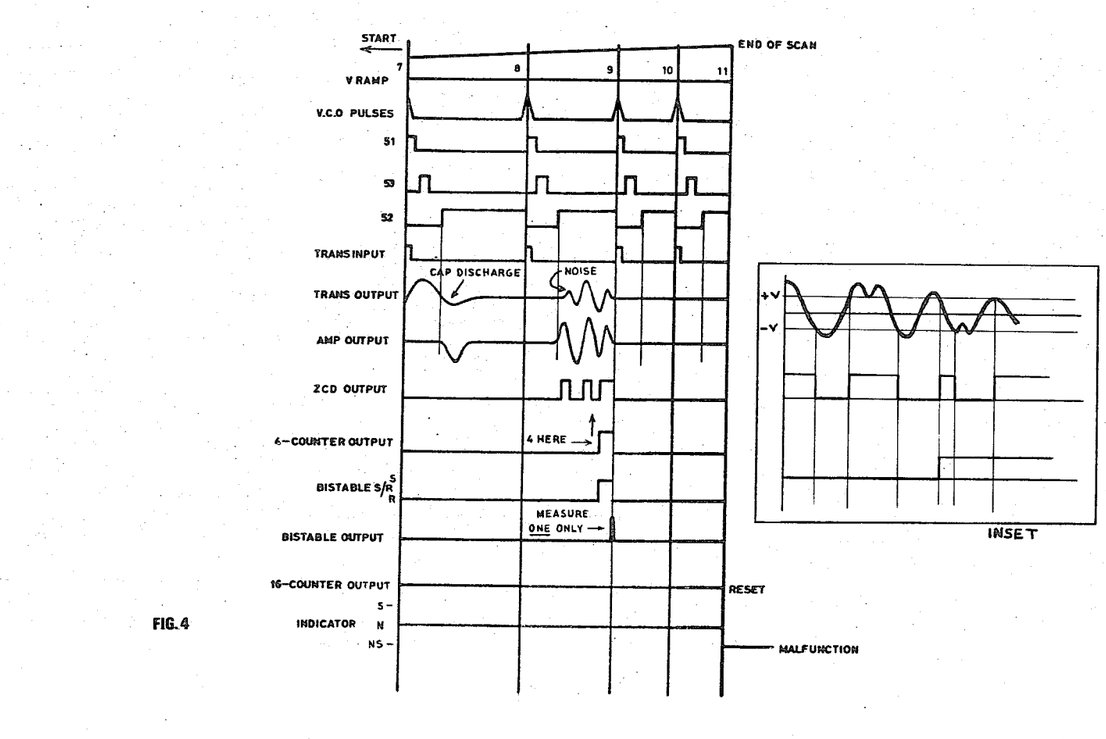
FIG. 4 shows the signals at various points of a system (as in FIG. 3) as it tests a non-operational transducer.

FIG. 4 shows the various signals at several points in a system as it is used to test a failed transducer (the cycles are arbitrarily numbered 7, 8 . . . 11). At point 7 some noise entered the system (a capacitative discharge), but this did not trigger the zero-crossing detector. At point 8 some other noise entered, triggered the zero-crossing detector, and gave a bistable set/reset output. However, this was the only such output during the whole scan, so the 16-counter did not give any output, and, at the end of scan signal from the voltage ramp generator, the indicator switched from the "neutral" position to the "no-signal" position.

Figure 5A:
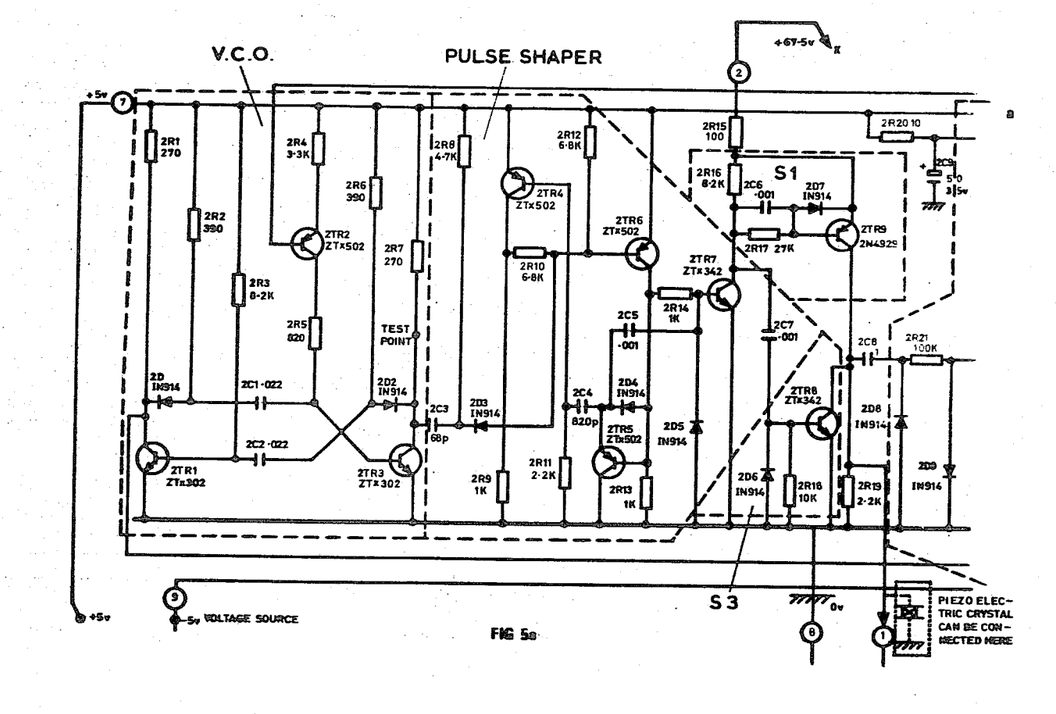
FIGS. 5a, 5b, and 5c show a detailed circuit diagram of an embodiment of the invention suitable for building on a printed circuit board.
Figure 5B:
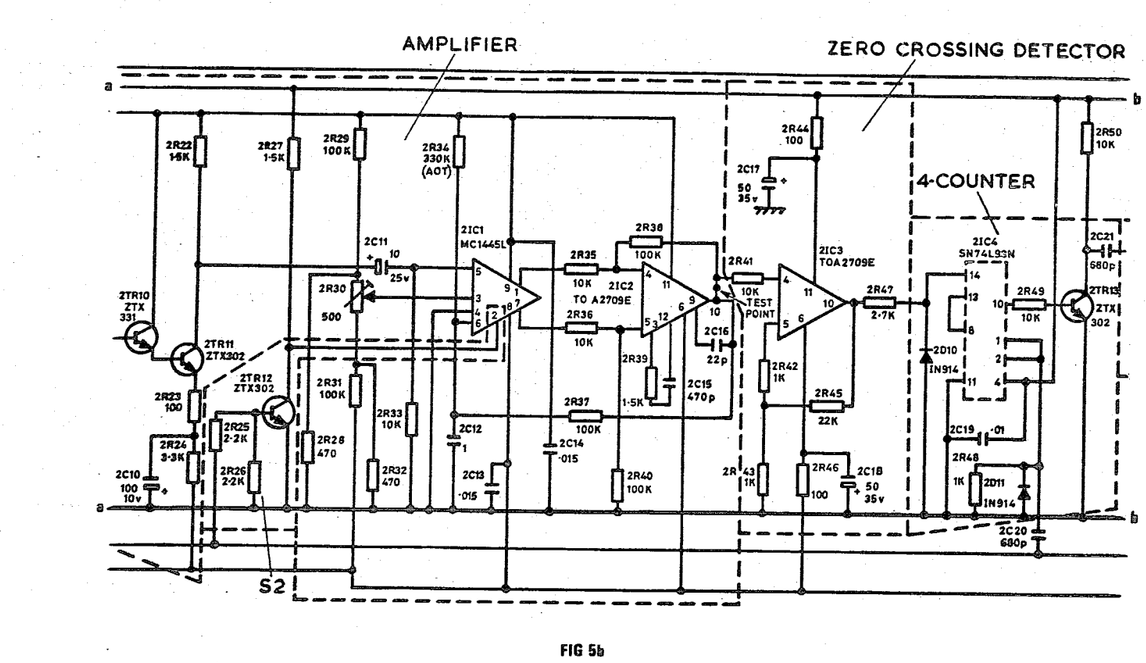
Figure 5C:
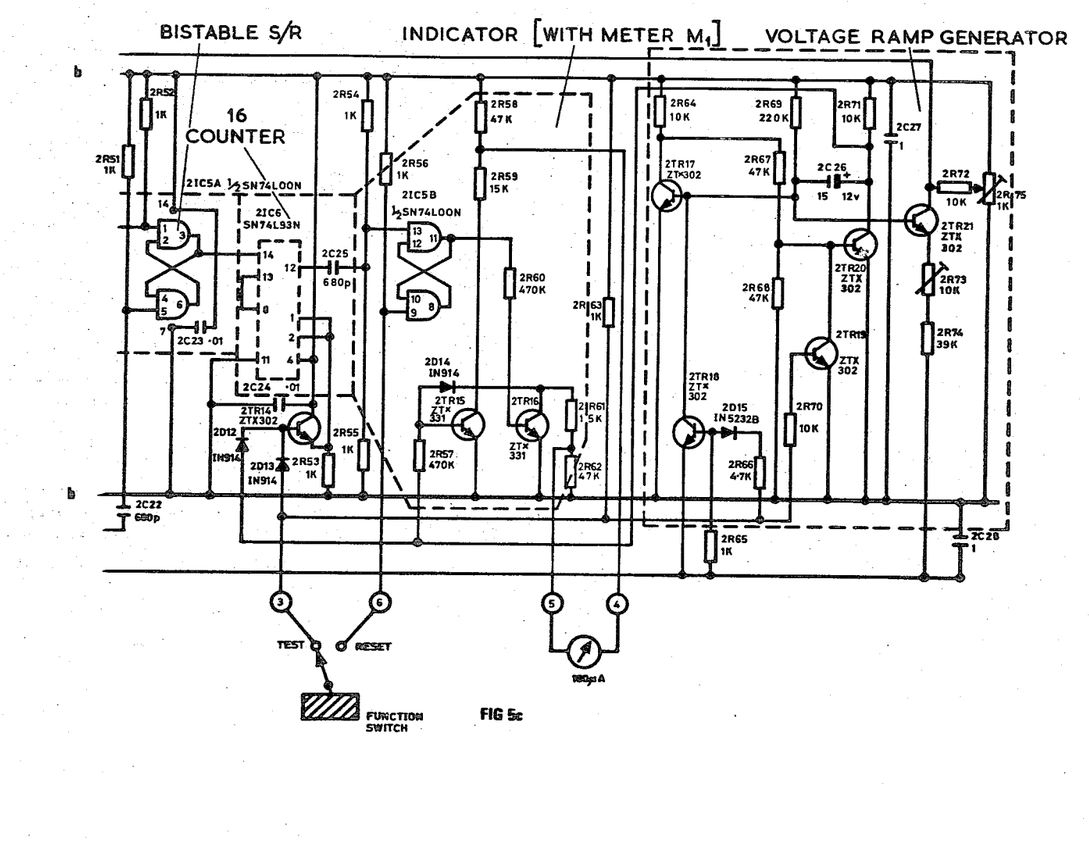

Referring finally to FIG. 5, this shows a detailed embodiment of the invention which has been designed specifically for building on a printed circuit board. It will be seen that the diagram has been marked off by broken lines into various areas which correspond to the elements of the schematic block diagrams of FIG. 1 and FIG. 2. The circuitry within these areas was designable by reference to state-of-the-art texts, catalogues and the like, and the invention of the present application is concerned with the way in which the system building blocks such as the switches, oscillator, amplifier and so on are connected together, and with the way in which the various signals in the system are manipulated and processed.

It will be seen that the piezoelectric transducer, which may be an accelerometer situated in an inaccessible part of an aero engine for example, may in effect be connected into the testing system at point 1, which, like the other circled numerals, is a reference number for a circuit board tag.

Tags 7 and 9 represent the input points of a voltage source of magnitude 5 volts. At tag 2 a voltage of +67.5 volts with respect to earth is applied to one side of the board, while the other side of the circuit is earthed through tag 8.

Between tags 3 and 6 is connected the function switch having the positions of test and reset as illustrated and described with reference to FIG. 2. A 100 μA ammeter is connected across tags 4 and 5, and it is this meter which shows the operational status of the transducer.

All circuit components are marked with circuit reference numbers which merely relate to the type of component and its value, for example, 2R74 39K means that the component is resistor No. 74 on board 2 of a larger assembly (not shown) and has a value of 39 K-ohms.

It will be further noticed that switches S1, S2 and S3 are all electronic switches, and that S2 is actually in the amplifier, but is controlled by circuitry included in area S2. The Indicator is obviously provided with circuitry to drive its associated meter.

Since the system is transistorized, a power source may conveniently be provided by a bank of dry batteries or other suitable means, voltage control circuits being readily designable to supply the required voltages at tags 2, 8, 7 and 9. It will thus be seen that the system may be made highly transportable.

What we claim is:

1. A method of testing a piezoelectric transducer to indicate whether it is properly connected in circuit and in an operable state, said method comprising:
   applying at least one voltage pulse stimulus across the piezoelectric transducer, removing said stimulus,
   subsequently detecting an operable indicating response from the transducer to said at least one voltage pulse only if the resulting transducer output exceeds a predetermined threshold magnitude and producing a first signal representative thereof,
   detecting an inoperable indicating non-responsive from the transducer if the resulting transducer output is less than said predetermined magnitude and producing a second signal representative thereof, and
   indicating that said transducer has responded or has not responded by means of an indicator which indicates a first discrete condition in response to said first signal and a second discrete condition in response to said second signal.

2. A method according to claim 1, in which the response or non-response of the transducer is detected by comparing the strength of the transducer response signal to said predetermined magnitude, wherein said detecting steps comprise:
   generating at least one signal $a$ if the strength of the transducer response signal exceeds the required signal strength,
   generating at least one further signal $b$ if the number of signals $a$ exceeds a first predetermined number, and
   generating said first signal if the number of signals $b$ exceeds a second predetermined number, said first signal thereby being indicative of the operational status of the piezoelectric transducer.

3. A method according to claim 2 in which the transducer response, signal is amplified before comparison is made with the predetermined magnitude.

4. A method according to claim 2 in which said first signal is used to operate indicator means, whereby the operational status of the transducer is indicated.

5. A method of testing a piezoelectric transducer, to indicate whether it is properly connected in circuit and is in operable state, said method comprising:
   using a first switch to apply at least one voltage pulse across the piezoelectric transducer,
   sequentially opening said first switch and closing a second switch connecting the piezoelectric transducer to signal detecting means, said signal detecting means being adapted to detect resulting transducer responses exceeding a predetermined level and to produce at least two discrete signals respectively indicative of whether said responses have exceeded said predetermined level and thus representative of the operational status of the connected piezoelectric transducer, and using said discrete signals to operate an indicator means said indicator means being adapted to indicate the operational status of the transducer by characteristically displaying each of said discrete signals in a cognizable manner.

6. A method according to claim 5 in which said first and second switches are operatively linked to an oscillator in such a manner that the oscillator output controls said switches, said switches respectively being closed and opened once during each cycle of oscillation, said first switch thereby applying a repeating voltage pulse to the piezoelectric transducer.

7. A method according to claim 6, in which said oscillator is a voltage controlled oscillator, said oscillator having its output frequency controlled by means of a voltage ramp input to said oscillator, said voltage ramp input being repeated at regular intervals of time.

8. A method according to claim 6, in which the signal from the oscillator is passed to a pulse shaper before being transmitted to said first and second switches, said pulse shaper producing a pulse of constant width which is then passed direct to said switches to control their opening and closing.

9. A method according to claim 5, wherein signal detecting means performs the functions of:

comparing the strength of signals from the piezoelectric transducer to a required signal strength corresponding to said predetermined level, generating at least one signal $a$ if the strength of the signal from the transducer exceeds the required signal strength, generating at least one further signal $b$ if the number of signals $a$ exceeds a first predetermined number, and generating a one of said discrete signals if the number of further signals $b$ exceeds a second predetermined number, said one discrete signal being indicative of the operational status of the piezoelectric transducer.

10. A method according to claim 9, in which the signal from the piezoelectric transducer is amplified before comparison is made with the required signal strength.

11. A method according to claim 9, in which generation of said further signal $b$ is performed by a first counter circuit element and a bistable circuit element connected in series, said counter circuit element being adapted to produce an output signal only when said first predetermined number of signals $a$ have been exceeded, said bistable circuit element being adapted to change from a first stable state to a second stable state on receipt of said output signal and to emit said further signal $b$ when changing from said second stable state to said first stable state.

12. A method according to claim 11, in which both said circuit elements are reset to an initial "no signal received" condition by means controlling the operation of the first, second and third switches, said circuit elements being reset at the time when said second switch is caused to open.

13. A method according to claim 9, in which generation of said one discrete signal is performed by a second counter circuit element adapted to produce said one discrete signal only when said second predetermined number of further signals $b$ have been exceeded.

14. A method according to claim 13, in which said second counter circuit element is reset to an initial "no signal received" condition at the end of every test of the transducer.

15. A method according to claim 13, in which said oscillator is a voltage controlled oscillator, said oscillator having it output frequency controlled by means of a voltage ramp input to said oscillator, said voltage ramp input being being repeated at regular intervals of time, and in which said second counter circuit element is reset to an initial "no signal received" condition at the end of every voltage ramp input to the voltage controlled oscillator.

16. A piezoelectric transducer testing system for indicating whether the transducer is properly connected in circuit and in an operable state, said system comprising:

a voltage source means connectable across the piezoelectric transducer for applying at least one voltage pulse across the piezoelectric transducer, signal detecting means connectable to said piezoelectric transducer for detecting a resulting response from the transducer and for producing a first signal output if said response is greater than a predetermined magnitude and a second signal output if said response is less than said predetermined magnitude, control means for effectively sequentially connecting said voltage source means and said signal detecting means to said piezoelectric transducer, and signal indicator means connected to said signal detecting means for indicating a first discrete condition in response to said first signal output and a second discrete condition in response to said second signal output, whereby the operational status of said transducer is indicated.

17. A system according to claim 16, in which said voltage source means is connectable to the transducer by means of a first switch and said signal detecting means is connectable to the transducer by means of a second switch, said first switch being open when said second switch is closed and vice-versa.

18. A system according to claim 17, in which said first and second switches are opened and closed once per oscillation of an oscillator.

19. A system according to claim 17, in which the transducer may be short-circuited by means of a third switch connected across said transducer, said third switch being adapted to close for a short time after the first switch has opened and before the second switch is closed.

20. A system according to claim 19, in which said first, second and third switches are operable in response to signals from an oscillator, said switches being closed and opened once during each cycle of oscillation.

21. A system according to claim 16, in which said signal detecting means comprise amplifying means, signal strength comparator means, and noise inhibition means.

22. A system according to claim 21, in which comparator means compares the strength of amplified transducer signals with a required strength and produces an output signal only when said transducer signals exceed said required strength.

23. A method of testing the integrity of a piezoelectric transducer said method comprising the steps of:
applying at least one voltage pulse across said transducer,
subsequently detecting the response signals of said transducer to said voltage pulse, using testing apparatus which produces an indicator signal when said response signals are detected,
inhibiting the transmission of electrical noise signals through the testing apparatus, and
indicating transducer integrity by indicator means responsive to said indicator signal,
said transducer response being detected and said electrical noise being inhibited by:
 a. comparing the strength of the transducer response signals to a minimum required signal strength,
 b. generating a further signal only when the strength of said transducer response signals exceed said minimum strength,
 c. generating said indicator signal only when more than a predetermined minimum number of said further signals are generated, said indicator signal being indicative of the integrity of said transducer.

24. A method according to claim 23, in which a repeating voltage is applied at one or more frequencies of application, at least one of said frequencies being substantially a sub-harmonic of the resonance frequency of the piezoelectric transducer.

25. A method according to claim 24, in which the voltage pulses are applied at a frequency which varies with respect to time.

26. A method according to claim 23 in which a second further signal is generated only when more than a first predetermined minimum number of first further signals are generated, said indicator signal being generated only when more than a second predetermined minimum number of said second further signals are generated.

27. A method according to claim 23 in which
 a. first switch means is closed to apply the voltage pulse, and
 b. said first switch means is then opened and second switch means is closed to connect the transducer to signal detecting and noise inhibiting means which receive transducer response signals and generate the indicator signal for operation of the indicator means.

28. A method according to claim 27 in which the transducer is selectively shorted circuited by means of a third switch, said third switch being adapted to close for a short time after the first switch is opened and before the second switch is closed.

29. A method according to claim 27, in which a repeating voltage pulse is applied by the first switch means.

30. A method according to claim 29, in which the repeating voltage pulse is applied at one or more frequencies, at least one of said frequencies being substantially a subharmonic of the resonance frequency of the piezoelectric transducer.

31. A method according to claim 30, in which said repeating voltage pulse is applied at a frequency which varies with respect to time.

32. A method according to claim 31 in which both first and second switch means are controlled by the output of a voltage-controlled oscillator such that said switch means are closed and opened once during each oscillation, said oscillator having its output frequency controlled by a periodic voltage ramp input to said oscillator.

33. A method according to claim 32, in which the piezoelectric transducer is selectively short circuited by third switch means, said third switch means being adapted to close for a short time after the first switch means is opened but before the second switch means is closed, said third switch means also being controlled by the oscillator output.

34. A system according to claim 32, in which the first switch is adapted to open and close at a frequency which is substantially a sub-harmonic of the resonant frequency of the transducer.

35. A system according to claim 34, in which the first switch is adapted to open and close at a frequency which varies with respect to time, such that at least one of the frequencies so produced is substantially a sub-harmonic of the resonant frequency of the transducer.

36. A system according to claim 35, in which the first switch is opened and closed once per oscillation of a voltage controlled oscillator, the input to said oscillator being operatively connected to a voltage ramp generator, whereby the output frequency of the oscillator is varied with respect to time.

37. Apparatus for testing the integrity of a piezoelectric transducer, comprising:
 a voltage source connectable across the transducer by first switch means,
 transducer response detecting means and electrical noise inhibition means connectable across said transducer by second switch means said first switch means, and
 indicator means responsive to an indicator signal generated by said detecting and inhibition means, said detecting and inhibition means comprising:
  a. signal strength comparator means in which the strength of the transducer response signals are compared to a minimum required signal strength and a further signal is generated only when the strength of said response signal exceeds said minimum strength, and
  b. signal counting means adapted to generate said indicator signal only when more than a predetermined minimum number of said further signals are generated, said indicator signal being indicative of the integrity of said transducer.

38. A system according to claim 37, in which said comparator means comprises a zero crossing detector.

39. Apparatus according to claim 37 in which a second further signal is generated only when more than a first predetermined minimum number of first further signals are generated, said indicator signal being generated only when more than a second predetermined minimum number of said second further signals are generated.

40. A system according to claim 39, in which said signal counting means comprises:
 a first counter circuit element adapted to receive signals from said comparator means and to emit an output signal only if a predetermined number of signals are received from said comparator means,
 a bistable circuit element adapted to receive signals from said first counter and to retain a first state if no signal is received, but to assume a second state if such a signal is received, said bistable circuit element being adapted to emit a signal when changing from said second state to said first state, and
a second counter circuit element adapted to receive signals from said bistable circuit element and to emit an output signal only if a predetermined number of signals are received from said bistable circuit element.

41. A system according to claim 40, in which said first and second counter circuit elements and said bistable circuit element are periodically reset to their initial "no signal received" condition, said first counter circuit element and said bistable circuit element being reset at every oscillation of an oscillator, said oscillator also controlling the first and second switch means such that both said respective switch means open and close in turn once per oscillation of the oscillator, said circuit elements being reset when said second switch is opened.

42. A system according to claim 41, in which said oscillator is a voltage controlled oscillator having a voltage ramp input, repeated at regular intervals, said second counter circuit being reset at the end of each voltage ramp.

43. A system according to claim 40 in which said circuit elements can be manually reset to their initial "no signal received" condition.

44. A system according to claim 37, in which said indicator means is a three-way indicator whereby the opertional status of the transducer is indicated, said three-way indicator having:

a "no-signal" position indicating that the transducer has failed or is not in circuit,
a "signal" position indicating that the transducer is operating satisfactorily, and
a "neutral" position indicating that the indicator itself is working.

45. A system according to claim 44, in which said three-way indicator is a meter for indicating an electrical quantity.

46. Apparatus according to claim 37 in which said first and second switches are operatively linked to an oscillator such that the oscillator output controls said switches, said switches resprectively being closed and opened once during each cycle of oscillation, said first switch being open when said second switch is closed and vice-versa.

47. A system according to claim 46, including a pulse shaper and in which the output from the oscillator is first passed to the pulse-shaper which produces pulses of constant width which are then passed direct to said switches to control their opening and closing.

48. Apparatus according to claim 46 in which the oscillator is a voltage controlled oscillator, said oscillator having its output frequency controlled by means of a periodic voltage ramp input.

49. Apparatus according to claim 46 in which a third switch is adapted to short-circuit the transducer by closing for a short time after the first switch has opened and before the second switch is closed, said third switch also being operatively linked to the oscillator.

* * * * *